US010602077B2

United States Patent
Lai et al.

(10) Patent No.: US 10,602,077 B2
(45) Date of Patent: Mar. 24, 2020

(54) IMAGE PROCESSING METHOD AND SYSTEM FOR EYE-GAZE CORRECTION

(71) Applicant: Wistron Corporation, New Taipei (TW)

(72) Inventors: Chin-Lun Lai, New Taipei (TW); Jun-Horng Chen, New Taipei (TW); Jie-Ci Yang, New Taipei (TW); Meng-Chao Kao, New Taipei (TW)

(73) Assignee: Winstron Corporation, New Taipei (TW)

( * ) Notice: Subject to any disclaimer, the term of this patent is extended or adjusted under 35 U.S.C. 154(b) by 261 days.

(21) Appl. No.: 15/838,364

(22) Filed: Dec. 12, 2017

(65) Prior Publication Data

US 2019/0110003 A1 Apr. 11, 2019

(30) Foreign Application Priority Data

Oct. 11, 2017 (TW) .............................. 106134824 A (51) Int. Cl.
*H04N 5/262* (2006.01)
*G06F 3/01* (2006.01)
*G06K 9/66* (2006.01)
*G06K 9/00* (2006.01)
*G06K 9/32* (2006.01)

(52) U.S. Cl.
CPC .......... *H04N 5/2628* (2013.01); *G06F 3/013* (2013.01); *G06K 9/0061* (2013.01); *G06K 9/00248* (2013.01); *G06K 9/3275* (2013.01); *G06K 9/66* (2013.01)

(58) Field of Classification Search
None
See application file for complete search history.

(56) References Cited

U.S. PATENT DOCUMENTS

| 2005/0232510 | A1* | 10/2005 | Blake | G06T 5/50 382/275 |
| 2008/0243614 | A1* | 10/2008 | Tu | G06Q 30/02 705/14.66 |
| 2016/0323540 | A1* | 11/2016 | Nilsson | G06T 7/73 |

OTHER PUBLICATIONS

Daniil Kononenko et al.,"Learning to look up: Realtime monocular gaze correction using machine learning", 2015 IEEE Conference on Computer Vision and Pattern Recognition (CVPR), Jun. 7-12, 2015,pp. 4667-4675.

* cited by examiner

*Primary Examiner* — Mark Roz
(74) *Attorney, Agent, or Firm* — JCIPRNET (57) ABSTRACT

An image processing method and an image processing system for eye-gaze correction are provided. The method is applicable to an image processing system having a screen and an image capturing device and includes the following steps. A user's face in front of the screen is captured by the image capturing device to generate a facial image. A head offset and an eye-gaze position of the user with respect to the screen are obtained based on the facial image so as to accordingly determine whether to correct the facial image. If yes, the facial image is corrected based on the eye-gaze position and a preset codebook to generate a corrected facial image, where the preset codebook records correction information of multiple preset eye-gaze positions.

20 Claims, 6 Drawing Sheets

IMAGE PROCESSING METHOD AND SYSTEM FOR EYE-GAZE CORRECTION

CROSS-REFERENCE TO RELATED APPLICATION

This application claims the priority benefit of Taiwan application serial no. 106134824, filed on Oct. 11, 2017. The entirety of the above-mentioned patent application is hereby incorporated by reference herein and made a part of this specification.

TECHNICAL FIELD

The disclosure relates to an image processing method and an image processing system, in particular to, an image processing method and an image processing system for eye-gaze correction.

BACKGROUND

As electronic technology and communication network have been continuously developed, hardware, software, and operating features of video conferencing are notably enhanced. The current video conferencing allows users to see other's motion through screens and thereby provides a realistic telepresence experience in communication. However, there exists a gap between the video conference and a real conference where all participants are sitting together. The main reason is because the center of a display of a video conferencing system (i.e. normally would be a display area of another participant's facial image) and a configuration position of a video capturing device are not the same so that the participants never appear to make eye contact with each other or appear tilted. Thus, the participants would be hardly concentrated on the conversation.

SUMMARY OF THE DISCLOSURE

Accordingly, an image processing method and an image processing system for eye-gaze correction are provided in a low-cost fashion.

According to one of the exemplary embodiments, the method is applicable to an image processing system having a screen and an image capturing device and includes the following steps. A user's face in front of the screen is captured by the image capturing device to generate a facial image. A head offset and an eye-gaze position of the user with respect to the screen are obtained based on the facial image so as to accordingly determine whether to correct the facial image. If yes, the facial image is corrected based on the eye-gaze position and a preset codebook to generate a corrected facial image, where the preset codebook records correction information of preset eye-gaze positions.

According to one of the exemplary embodiments, the system includes a screen, an image capturing device, a memory, and a processor, where the processor is connected to the screen, the image capturing device, and a memory. The image capturing device is disposed on a same side as the screen and configured to capture a face of a user in front of the screen to generate a facial image. The memory is configured to store data, images, and a preset codebook, where the preset codebook records correction information of preset eye-gaze positions. The processor is configured to obtain a head offset and an eye-gaze position of the user with respect to the screen from the facial image, determine whether to correct the facial image according to the head offset and the eye-gaze position, and correct the facial image based on the eye-gaze position and the preset codebook to generate a corrected facial image in response to the facial image determined to be corrected.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
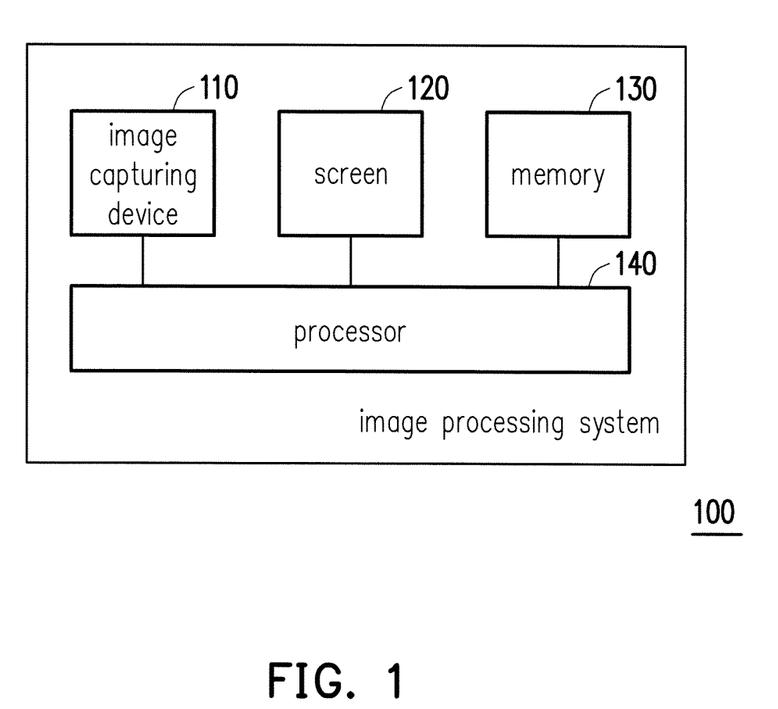
FIG. 1 illustrates a schematic diagram of a proposed image processing system in accordance with one of the exemplary embodiments of the disclosure.

FIG. 1 illustrates a schematic diagram of a proposed image processing system in accordance with one of the exemplary embodiments of the disclosure. All components of the image processing system and their configurations are first introduced in FIG. 1. The functionalities of the components are disclosed in more detail in conjunction with FIG. 2.

Referring to FIG. 1, an image processing system 100 would include, but not limited to, an image capturing device 110, a screen 120, a memory 130, and a processor 140, where the processor 140 would be connected to the image capturing device 110, the screen 120, and the memory 130, and the image capturing device 110 would be disposed at a same side as the screen 120. In the present exemplary embodiment, all the aforementioned components may be integrated in the image processing system 100 as an all-in-one device. In such case, the image processing system 100 may be an electronic device having image capturing and display features, such as a smart phone or a tabular computer. In another exemplary embodiment, the image processing system 100 may be a computer system having the screen 120, the memory 130, and the processor 140, and the image capturing device 110 may be externally connected to the computer system. The disclosure is not limited in this regard.

The image capturing device 110 is configured to capture images in front of the screen 130 and includes a camera lens having an optical lens and a sensing element. The sensing element is configured to sense intensity entering the optical lens to thereby generate images. The sensing element may be, for example, charge-coupled-device (CCD) elements, complementary metal-oxide semiconductor (CMOS) elements. Moreover, the image capturing device 110 may be a 2D or a 3D image capturing device. The disclosure is not limited in this regard.

The screen 120 is configured to display images for the user to view. In the present exemplary embodiment, the screen 120 may be a liquid crystal display (LCD), a light-emitting diode (LED) display, an organic light-emitting diode (OLED) display, a field emission display (FED), or other types of displays.

The memory 130 is configured to store data such as images and programming codes and may one or a combination of a stationary or mobile random access memory (RAM), a read-only memory (ROM), a flash memory, a hard drive, other similar devices or integrated circuits.

The processor 140 is configured to control the operation among the components of the image processing system 100 and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices, a combination of aforementioned devices or integrated circuits.

Detailed steps of how the image capturing system 100 performs its image processing method would be illustrated along with each component hereafter.

Figure 2:
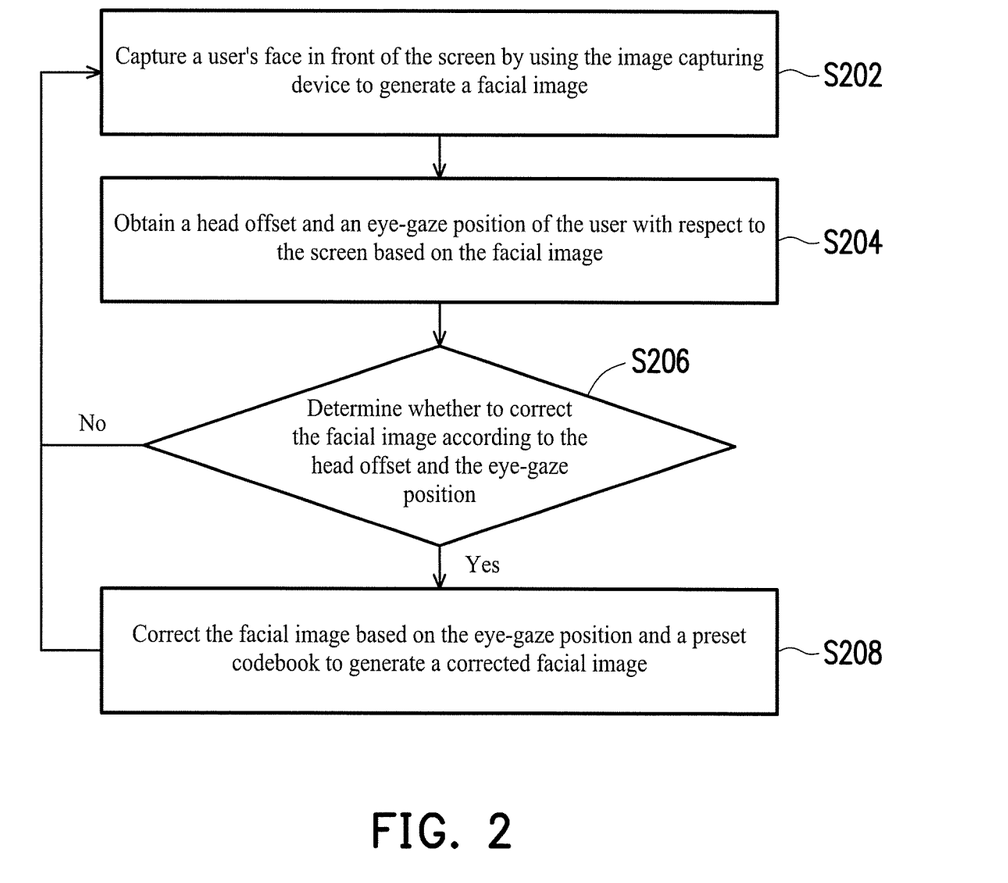
FIG. 2 illustrates an image processing method for eye-gaze correction in accordance with one of the exemplary embodiments of the disclosure.

FIG. 2 illustrates an image processing method for eye-gaze correction in accordance with one of the exemplary embodiments of the disclosure. Assume that the present exemplary embodiment is applicable to a scenario of video conferencing, where a user is talking with another participant in front of the screen 120 of the image processing system 100.

Referring to both FIG. 1 and FIG. 2, the processor 140 of the image processing system 100 would capture a user's face in front of the screen 120 by using the image capturing device 110 to generate a facial image (Step S202) and obtain a head offset and an eye-gaze position of the user with respect to the screen 120 from the facial image (Step S204).

In detail, the processor 140 may detect a facial region from the facial image by leveraging a human face detection algorithm, such as AdaBoost algorithm, to calculate the head offset of the user with respect to the screen 120 and extract facial silhouette and features by leveraging a facial landmark detection algorithm to calculate the eye-gaze position of the user with respect to the screen 120. In the present exemplary embodiment, the head offset and the eye-gaze position are calculated with respect to a center of the screen 120 or a center of an image displayed on the screen 120 (i.e. normally would be a display area of another participant's facial image) to simulate a real-life meeting environment.

Figure 3:
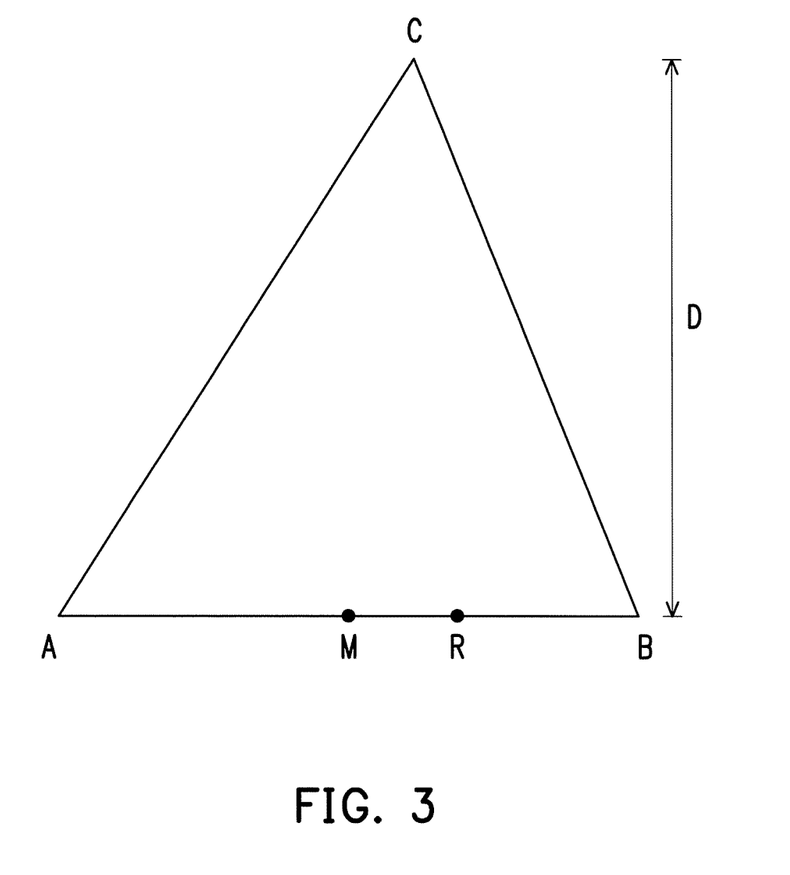
FIG. 3 illustrates a schematic diagram of a position relation between an image processing system and a user in accordance with one of the exemplary embodiments of the disclosure.

In terms of the head offset, it is used to identify a face-turning direction so as to determine whether to perform eye-gaze correction later on. The processor 140 may analyze the facial region in the facial image based on a configuration position of the image processing system 100 to estimate the head offset of the user. For example, FIG. 3 illustrates a schematic diagram of a position relation between the image processing system 100 and the user in accordance with one of the exemplary embodiments of the disclosure. Assume that average facial areas with respect to different preset vertical distances (referred to as "a first correspondence relationship"), a configuration position of the image capturing device 110, and a size of the screen 120 may be stored in the memory 130. Herein, a point A and a point B respectively represent two sides of the screen 120, where the image capturing device 110 is disposed at the point A. Assume that the user at a point C is facing toward the screen 120, and the processor 140 may use an area of the facial region of the user (i.e. a facial region between a point M and a point R) as well as a ratio of distances between the facial region and two sides of the screen 120 (i.e. a distance between the point M and the point A to that between a point R and the point B) to respectively calculate the a vertical distance D and an orientation of the user with respect to the screen 110 and thereby estimate a head offset of the user with respect to the screen 110.

In terms of the eye-gaze position, the processor 140 may determine the eye-gaze position from the facial image by leveraging a machine learning algorithm (e.g. a deep learning algorithm). In the present exemplary embodiment, the processor 140 may set multiple virtual gaze label points in a fixed region of the facial image so as to determine the gaze label point corresponding to the current eye-gaze position (i.e. with a minimal distance therebetween) to be the eye-gaze position to speed up the computation.

Referring back to FIG. 2, the processor 140 would determine whether to correct the facial image according to the head offset and the eye-gaze position (Step S206). For example, when the head offset exceeds a preset offset or the eye-gaze position is not within a preset region, it means that the user is not looking at the screen 120 (i.e. not looking at another participant of the video conferencing), no correction would be performed on the facial image. Next, the flow would return to Step S202, and the processor 140 would capture a next facial image by using the image capturing device 110.

In response to the facial image determined to be corrected, the processor 140 would correct the facial image based on the eye-gaze position and a preset codebook to generate a corrected facial image (Step S208), where the preset codebook records correction information of multiple preset eye-gaze positions and is prestored in the memory 130. A correction processor would be described in detail along with a schematic diagram of eye-gaze positions as illustrated in FIG. 4 in accordance with one of exemplary embodiments of the disclosure and a schematic diagram of eye-gaze positions before and after image correction as illustrated in FIG. 5 in accordance with one of exemplary embodiments of the disclosure as follows.

Figure 4:
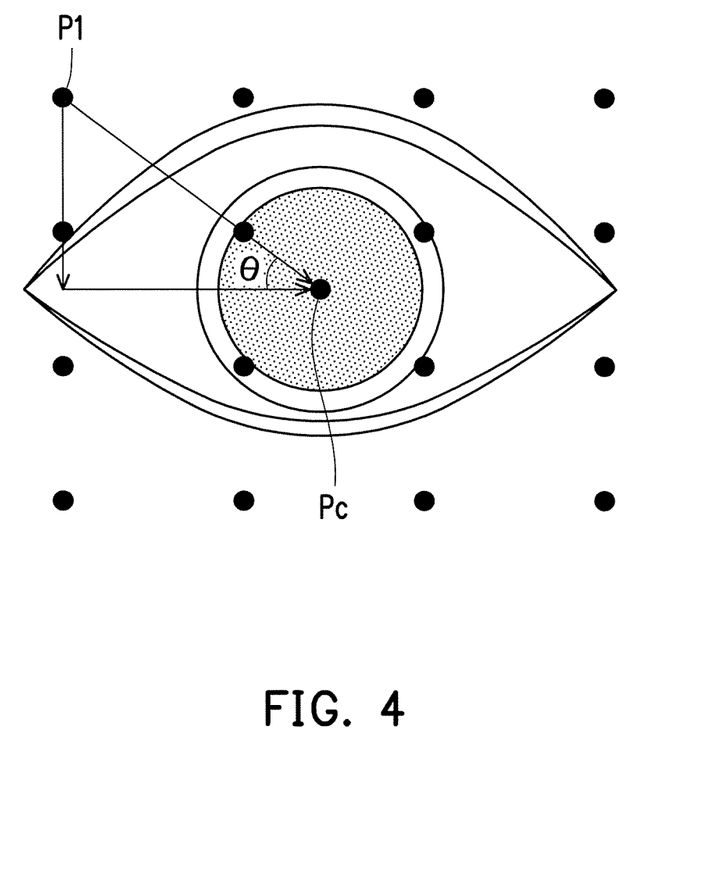
FIG. 4 illustrates a schematic diagram of eye-gaze positions in accordance with one of exemplary embodiments of the disclosure.
Figure 5:
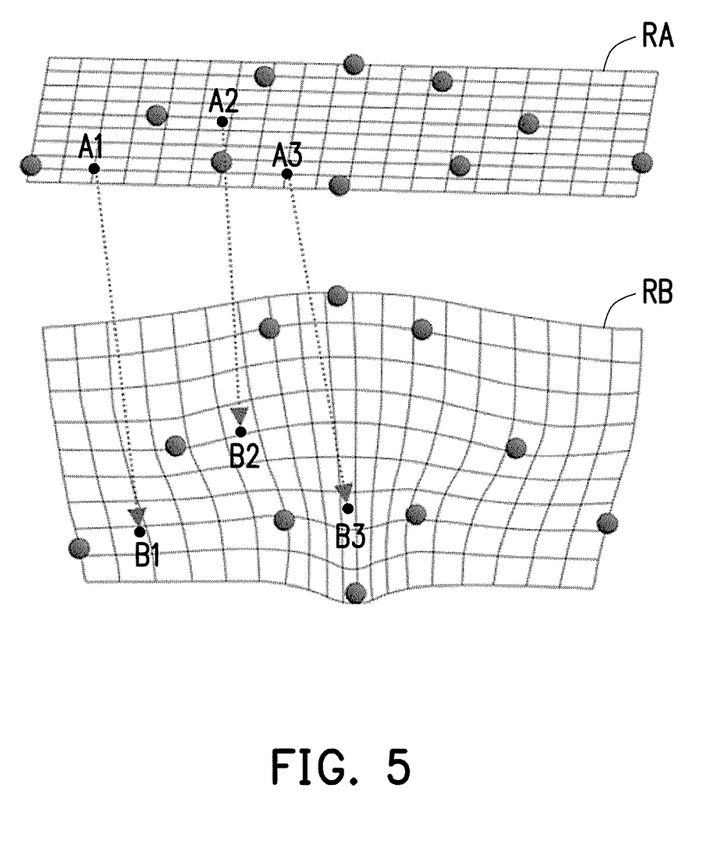
FIG. 5 illustrates a schematic diagram of eye-gaze positions before and after image correction in accordance with one of exemplary embodiments of the disclosure.

First referring to FIG. 4, assume that the processor 140 has determined that an eye-gaze position is originally at an eye-gaze label point P1 in a facial image. The processor 140 would estimate an angle θ between the eye-gaze label point $P_1$ and an image center $P_C$, namely, an angle between the image processing device 110 and the user's eye-gaze position, which is also an amount of the correction that the eye-gaze would be corrected. Hence, the processor 140 would correct the eye-gaze back to the image center $P_C$ according to the preset codebook.

For a more natural effect on the eye-gaze correction, the processor 140 may use an angle between each eye-gaze label and an image center in multiple images in a training stage to determine a correction vector corresponding to each spatial point in the facial image so as to construct the aforesaid preset codebook. To be specific, referring to FIG. 5, during the eye-gaze position correction processor, for each pixel of an eye region RB in a facial image to be corrected, and the processor 140 would search for a correction vector of each pixel from a lookup table, extract a corresponding pixel from an eye region RA of the original facial image, and fill each extracted pixel into the eye region RB in a point-to-point mapping fashion. For example, pixels B1, B2, and B3 in the eye region RB respectively correspond to pixels A1, A2, and A3 in the eye region RA.

In the present exemplary embodiment, the image processing system 100 would be implemented as a video conferencing system for video conferencing and thus would further include a communication interface (not shown). Such communication interface may support any wired or wireless communication standard for data transmission with other electronic devices. After the processor 140 generates the corrected facial image, it would transmit the corrected facial image via the communication interface to another participant's electronic device. The corrected facial image received by another participant would create a real-life conference effect. In another exemplary embodiment, the image processing system 100 would be implemented as a self-portrait system and display the corrected facial image on the screen 120 for the user.

Moreover, in the present exemplary embodiment, since mainly the eye region in the facial image is corrected in the aforementioned exemplary embodiments, the processor 140 would perform image smoothing on the corrected facial image to reduce discontinuities in color, textures, edges or to reduce gaps or interferences between the foreground and the background. As such, an obvious retouch may be less visible for a natural effect.

Figure 6:
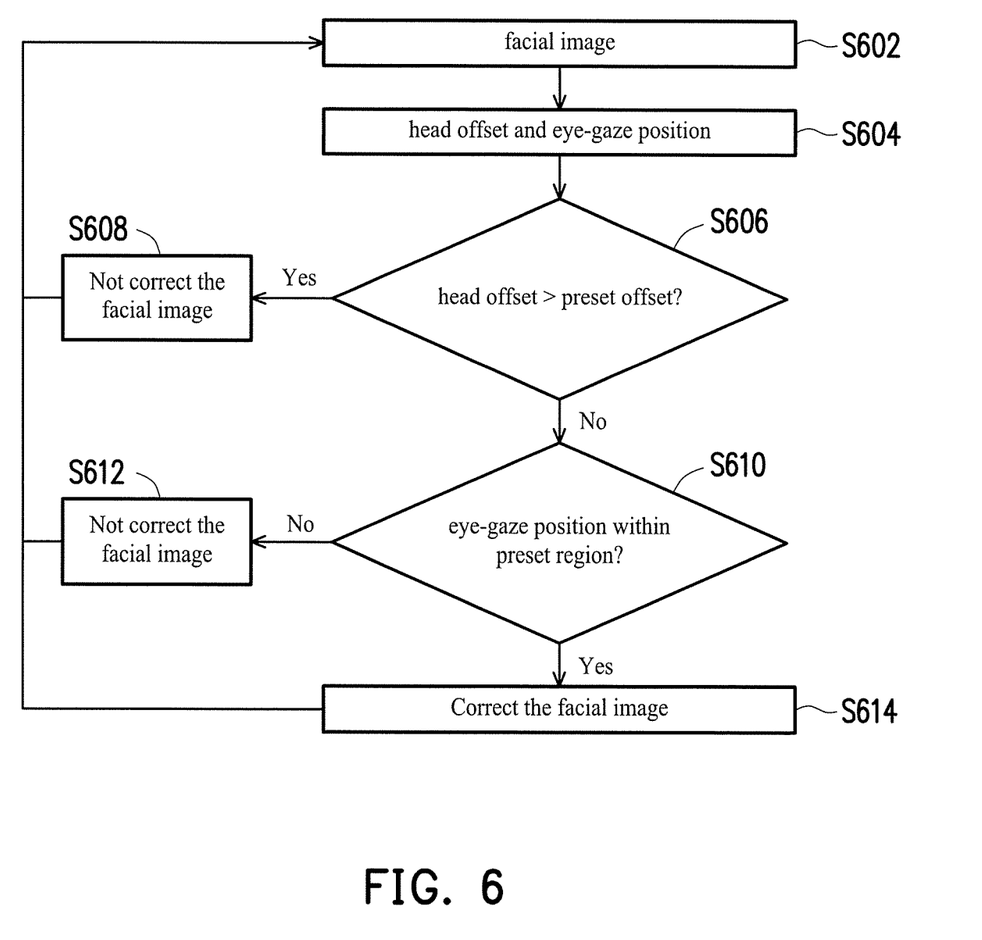
FIG. 6 illustrates a flowchart of an image processing method for eye-gaze correction in accordance with one of exemplary embodiments of the disclosure.

FIG. 6 illustrates a flowchart of an image processing method for eye-gaze correction in accordance with one of exemplary embodiments of the disclosure.

Referring to both FIG. 1 and FIG. 6, the processor 140 of the image processing system 100 would capture a user's face in front of the screen 120 by using the image capturing device 110 to generate a facial image (Step S602) and obtain a head offset and an eye-gaze position of the user with respect to the screen 120 from the facial image (Step S604).

Next, the processor 140 would determine whether the head offset is greater than a preset offset (Step S606). If the head offset is greater than the preset offset, it means that the user is not looking at the screen 120, and thus the processor 140 would not correct the facial image (Step S608). The flow would then return to Step S602, and the processor 140 would capture a next facial image by using the image capturing device 110.

Next, if the head offset is not greater than the preset offset, the processor 140 would further determine whether the eye-gaze position is within a preset region (Step S610). If the eye-gaze position is not within the preset region, it means that the user is not looking at the screen 120 (e.g. the user is facing toward the screen 120 but looking at the far distance or the top), and the processor 140 would not correct the facial image (Step S612). The flow would then return to Step S602, and the processor 140 would capture a next facial image by using the image capturing device 110. If the eye-gaze position is within the preset region, the processor 140 would correct the facial image according to the eye-gaze position and a preset codebook to correct the facial image (Step S614) so as to generate and output a corrected facial image.

In view of the aforementioned descriptions, the image processing method and system for eye-gaze correction proposed in the disclosure use the image capturing device to capture a user's facial image, determine whether to correct the facial image according to a head offset and an eye-gaze position, and correct the facial image based on the eye-gaze position and a preset codebook. The disclosure would correct the eye-gaze position to an accurate position without requiring the user to pre-register any image with correct eye-gaze positions. Moreover, the image processing method proposed in the disclosure would be applicable to any consumer electronic product with a 2D or 3D camera to perform eye-gaze correction, and thus would greatly increase the applicability in practical application.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image processing method for eye-gaze correction, applicable to an image processing system having a screen and an image capturing device, the image processing method comprising:
   capturing a face of a user in front of the screen by using the image capturing device to generate a facial image;
   obtaining a head offset and an eye-gaze position of the user with respect to the screen from the facial image, wherein the head offset is calculated according to a configuration position of the image capturing device and a size of the screen;

determining whether to correct the facial image according to the head offset and the eye-gaze position; and in response to the facial image determined to be corrected, correcting the facial image based on the eye-gaze position and a preset codebook to generate a corrected facial image, wherein the preset codebook records correction information of a plurality of preset eye-gaze positions.

2. The method according to claim 1, wherein the step of obtaining the head offset and the eye-gaze position of the user with respect to the screen from the facial image comprises:

calculating a vertical distance and an orientation of the user with respect to the screen according to an area of a facial region in the facial image, the configuration position of the image capturing device, and the size of the screen so as to obtain the head offset.

3. The method according to claim 2, wherein a first correspondence relationship between distances and areas is prestored in the image processing system, wherein the first correspondence relationship records average facial areas with respect to different preset vertical distances, and wherein the step of calculating the vertical distance and the orientation of the user with respect to the screen according to the area of the facial region in the facial image, the configuration position of the image capturing device, and the size of the screen comprises:

obtaining the area of the facial region in the facial image, obtaining a distance corresponding to the area of the facial region according to the first correspondence relationship, and setting the obtained distance as the vertical distance of the user with respect to the screen; and obtaining a ratio of distances between the facial region to two sides of the screen to accordingly calculate the orientation of the user with respect to the screen.

4. The method according to claim 2, wherein the vertical distance and the orientation of the user with respect to the screen is a vertical distance and an orientation of the user with respect to a center of the screen.

5. The method according to claim 2, wherein the vertical distance and the orientation of the user with respect to the screen is a vertical distance and an orientation of the user with respect to a center of a displayed image on the screen.

6. The method according to claim 1, wherein the step of obtaining the head offset and the eye-gaze position of the user with respect to the screen from the facial image comprises:

setting a plurality of gaze label points in a fixed region of the facial image; and determining the gaze label point corresponding to an eye-gaze of the user by leveraging a machine learning algorithm and setting the determined gaze label point as the eye-gaze position.

7. The method according to claim 1, wherein the step of determining whether to correct the facial image according to the head offset and the eye-gaze position comprises:

determining whether the head offset is greater than a preset offset;

in response to the head offset greater than the preset offset, not correcting the facial image; and in response to the head offset not greater than the preset offset, determining whether the eye-gaze position is within a preset region so as to accordingly determine whether to correct the facial image.

8. The method according to claim 7, wherein the preset region is at an eye region in the facial image, and wherein the step of determining whether the eye-gaze position is within the preset region so as to accordingly determine whether to correct the facial image comprises:

determining whether the eye-gaze position is within the preset region of the facial image;

in response to the eye-gaze position not within the preset region of the facial image, not correcting the facial image; and in response to the eye-gaze position within the preset region of the facial image, correcting the facial image.

9. The method according to claim 6, wherein the correction information recorded in the preset codebook is a correction vector of each of the preset eye-gaze positions, and wherein the step of correcting the facial image based on the eye-gaze position and the preset codebook to generate the corrected facial image comprises:

obtaining an angle between the eye-gaze position and a center of the fixed region and setting the obtained angle as an eye-gaze correction angle;

looking up the preset codebook by using the eye-gaze correction angle to obtain the correction vector; and generating the corrected facial image according to the corrected vector and the facial age.

10. The method according to claim 1, wherein after the step of generating the corrected facial image, the method further comprises a step of:

performing image smoothing on the corrected facial image.

11. The method according to claim 1, wherein the image processing system is a video conference system further comprising a communication interface, and wherein after the step of generating the corrected facial image, the method further comprises a step of:

transmitting the corrected facial image to another electronic device via the communication interface.

12. The method according to claim 1, wherein the image processing system is a self-portrait system, and wherein after the step of generating the corrected facial image, the method further comprises a step of:

displaying the corrected facial image on the screen.

13. An image processing system comprising:

a screen;

an image capturing device, disposed on a same side as the screen, and configured to capture a face of a user in front of the screen to generate a facial image;

a memory, configured to store data, images, and a preset codebook, wherein the preset codebook records correction information of a plurality of preset eye-gaze positions;

a processor, connected to the screen, the image capturing device, and the memory, and configured to obtain a head offset and an eye-gaze position of the user with respect to the screen from the facial image, determine whether to correct the facial image according to the head offset and the eye-gaze position, and correct the facial image based on the eye-gaze position and the preset codebook to generate a corrected facial image in response to the facial image determined to be corrected, wherein the head offset is calculated according to a configuration position of the image capturing device and a size of the screen.

14. The system according to claim 13, wherein the memory further stores the configuration position of the image capturing device and the size of the screen, and the processor calculates a vertical distance and an orientation of the user with respect to the screen according to an area of a facial region in the facial image, the configuration position of the image capturing device, and the size of the screen so as to obtain the head offset.

15. The system according to claim 14, wherein the memory stores a first correspondence relationship between distances and areas, wherein the first correspondence relationship records average facial areas with respect to different preset vertical distances, wherein the processor obtains the area of the facial region in the facial image, obtains a distance corresponding to the area of the facial region according to the first correspondence relationship, and sets the obtained distance as the vertical distance of the user with respect to the screen, and wherein the processor obtains a ratio of distances between the facial region to two sides of the screen to accordingly calculate the orientation of the user with respect to the screen.

16. The system according to claim 13, wherein the processor sets a plurality of gaze label points in a fixed region of the facial image, determines the gaze label point corresponding to an eye-gaze of the user by leveraging a machine learning algorithm, and sets the determined gaze label point as the eye-gaze position.

17. The system according to claim 13, wherein the processor determines whether the head offset is greater than a preset offset, does not correct the facial image in response to the head offset greater than the preset offset, and determines whether the eye-gaze position is within a preset region in response to the head offset not greater than the preset offset, wherein the processor does not correct the facial image in response to the eye-gaze position not within the preset region of the facial image and corrects the facial image in response to the eye-gaze position within the preset region of the facial image.

18. The system according to claim 16, wherein the correction information recorded in the preset codebook is a correction vector of each of the preset eye-gaze positions, and wherein the processor obtains an angle between the eye-gaze position and a center of the fixed region, sets the obtained angle as an eye-gaze correction angle, looks up the preset codebook by using the eye-gaze correction angle to obtain the correction vector, and generates the corrected facial image according to the corrected vector and the facial image.

19. The system according to claim 13 further comprising:
a communication interface, configured to transmit the corrected facial image to another electronic device.

20. The system according to claim 13, wherein the screen is further configured to display the corrected facial image.

* * * * *

UNITED STATES PATENT AND TRADEMARK OFFICE
CERTIFICATE OF CORRECTION

| | |
|---|---|
| PATENT NO. | : 10,602,077 B2 |
| APPLICATION NO. | : 15/838364 |
| DATED | : March 24, 2020 |
| INVENTOR(S) | : Chin-Lun Lai et al. |

Page 1 of 1

It is certified that error appears in the above-identified patent and that said Letters Patent is hereby corrected as shown below:

On the Title Page

Item (73) Assignee should read: Wistron Corporation, New Taipei City, (TW)

Signed and Sealed this
First Day of September, 2020

Andrei Iancu
*Director of the United States Patent and Trademark Office*